United States Patent
Fiszman et al.

(10) Patent No.: US 7,580,994 B1
(45) Date of Patent: Aug. 25, 2009

(54) METHOD AND APPARATUS FOR ENABLING DYNAMIC SELF-HEALING OF MULTI-MEDIA SERVICES

(75) Inventors: Sergio Fiszman, Nepean (CA); Chris Ryerson, Kanata (CA); David Price, Reading (GB); Elizabeth Goldrich, Dallas, TX (US); Kevin Howe-Patterson, Nepean (CA); Laurence Beaulleu, Kanata (CA); Michael Leader, Stittsville (CA); Paul Ensing, Nepean (CA); Pierre Fournier, Ottawa (CA); Richard Taylor, Manotick (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 10/939,019

(22) Filed: Sep. 10, 2004

Related U.S. Application Data

(60) Provisional application No. 60/537,923, filed on Jan. 21, 2004.

(51) Int. Cl.
*G06F 15/173* (2006.01)
(52) U.S. Cl. .................................................. 709/223
(58) Field of Classification Search ......... 709/223–226, 709/200
See application file for complete search history.

(56) References Cited

U.S. PATENT DOCUMENTS

| | | | | |
|---|---|---|---|---|
| 5,204,955 A | * | 4/1993 | Kagei et al. | 714/55 |
| 5,414,812 A | * | 5/1995 | Filip et al. | 707/103 R |
| 5,740,357 A | * | 4/1998 | Gardiner et al. | 714/57 |
| 5,748,098 A | * | 5/1998 | Grace | 370/242 |
| 5,826,239 A | * | 10/1998 | Du et al. | 705/8 |
| 6,012,152 A | * | 1/2000 | Douik et al. | 714/26 |
| 6,035,331 A | * | 3/2000 | Soga et al. | 709/223 |
| 6,718,486 B1 | * | 4/2004 | Roselli et al. | 714/41 |
| 6,823,382 B2 | * | 11/2004 | Stone | 709/224 |

OTHER PUBLICATIONS

Cavalieri, et al., "A fault recovery model in IEC/ISA FieldBus communication protocol", Jul. 1999, Industrial Electonics, 1999. ISIE '99. vol. 3, pp. 1421-1426.*

Edelweiss, et al., "Workflow modeling: exception and failure handling representation", Nov. 1998, Computer Science, 1998. SCCC '98. pp. 58-67.*

Smarkusky, et al., "Hierarchical performance modeling for distributed system architectures", 2000, Computers and Communications, 2000. pp. 659-664.*

Teshigawara, et al. "LAN fault management", Apr. 1996, Network Operations and Management Symposium, 1996., IEEE. vol. 2, pp. 540-551.*

* cited by examiner

*Primary Examiner*—Kenny S Lin
*Assistant Examiner*—Julian Chang
(74) *Attorney, Agent, or Firm*—Anderson Gorecki & Manaras LLP

(57) ABSTRACT

In the service architecture of the invention, each service is viewed as a hierarchical arrangement of service components. At least one management agent is associated with each layer, and is used to manage and preserve the expected performance of the service components. The management agents cooperatively exchange management information regarding the service components at their layers to permit service self-management and self-healing, enabling restoration and recovery with minimum or no human intervention.

28 Claims, 14 Drawing Sheets

METHOD AND APPARATUS FOR ENABLING DYNAMIC SELF-HEALING OF MULTI-MEDIA SERVICES

RELATED APPLICATIONS

This application claims priority under 35 U.S.C. §1.119(e) to U.S. Provisional Patent Application No. 60/537,923 filed Jan. 21, 2004.

FIELD OF THE INVENTION

This invention relates generally to the field of services and more particularly to an architecture which permits dynamic maintenance, restoration and recovery of services.

BACKGROUND OF THE INVENTION

Carriers and Service Providers (SPs) face increasing consumer demand for various services associated with multi-media data (such as voice, video or IP data). Each service may be associated with different types of data and be provided by any one of a variety of different vendors, and thus each may support slightly different operating needs and have different characteristics. Because services are associated with different vendors, management of an aggregated service set is complicated, often degrading the levels of service recovery and restoration that can be provided to a consumer.

In order to satisfy the increasing demand for these divergent services, multi-media solutions provided by the carriers and service providers are becoming increasingly complex and expensive. However, carriers and service providers generally prefer a less complex network and services infrastructure in order to reduce Operations Expenditures (OpEx) and Total Cost of Ownership (TCO) of the network. This is a problem because the types of multi-media services that SPs, carriers and the emerging service brokers are requesting represent a new breed of services, having differing properties from their predecessors. For example, while current services are provided with a relatively static and long life span, it is becoming desirable to offer services having a short, dynamic life span. The future services should be managed with minimal human intervention, with the number of services being provided in the network being easily scalable in magnitude. The types of services to be provided are also changing from merely transport, connectivity and voice services to include multi-media, heterogeneous services capable of relying on location, presence and availability of the consumer. As more diverse services are consumed for shorter time periods, the overall costs of the services will be reduced, requiring a dynamic billing structure capable of being supported on a pay per use or credit based schemes. Service quality may be controlled not merely on a transport level, but also using other types of service properties such as Quality of Experience (QoE), subscribers' behavior, available features and transaction rate. Due to the large number of services which are to be made available over multiple domains it will become desirable to aggregate the services through hierarchical nesting. Enhanced security capability should be provided, to enable service provider brokering to satisfy end-consumer needs. In addition, the ability to make services available on multiple access devices and access networks, supporting a plurality of business models, will be required.

It is unlikely that the expected service characteristics of high scalability, problem solving speed, complexity, rapid integration, security, price and significantly reduced OpEx can be realized on existing operational support systems (OSS). At present, management of connectivity functionality (for example, a L1-L4 network stack) is partially supported using a variety of differing management methods, Application Programming Interfaces (APIs) protocols and information models. While current research is being done into improving performance of services at an enterprise level, the solutions do not address the unique issues associated with delivering the new breed of multi-media services (MMS) at a carrier and SP level. Accordingly, it is therefore desirable to identify a method and apparatus for optimizing and simplifying management aspects of multi-vendor, multi-media networks & services to reduce OpEx and TCO of the network infrastructure.

SUMMARY OF THE INVENTION

A method and apparatus is provided for Multi-media Services self-management and self-healing, enabling restoration and recovery with minimum or no human intervention.

According to one aspect of the invention, a service architecture includes a service apportioned into a hierarchy of service layer components and a plurality of hierarchically linked management agents, at least one of the management agents associated with each of the service layers for managing service layer components at and below the associated service layer.

According to another aspect of the invention, a method for dynamic self healing of a service component in a network is provided, wherein the service component is part of a plurality of hierarchically ordered service components comprising a service, and wherein the network includes a corresponding hierarchy of management agents loosely coupled to the hierarchy of service components. The method includes the steps of monitoring, by a management agent associated with the hierarchical layer of the service component, a performance of the service component and detecting, by the management agent, a performance issue with the service component. Upon detecting the performance issue, the management agent forwards an alarm to a parent management agent associated with a parent service component of the service component. The parent management agent selectively issues a restoration command to (a child) management agent, and the (child) management agent triggers restoration and recovery at the service component.

According to a further aspect of the invention, a method for building a self-managed service network, wherein the service architecture comprises hierarchically linked service components includes the steps of deploying management agents in the network, each management agent associated with one layer of a plurality of hierarchical layers in the network and including functionality for managing service components at the associated layer of the network, and registering service components in the network, the service component being registered at a particular layer of the network, including storing information associated with the service component in a repository accessible by the management agent associated with the particular layer.

DETAILED DESCRIPTION

Figure 1:
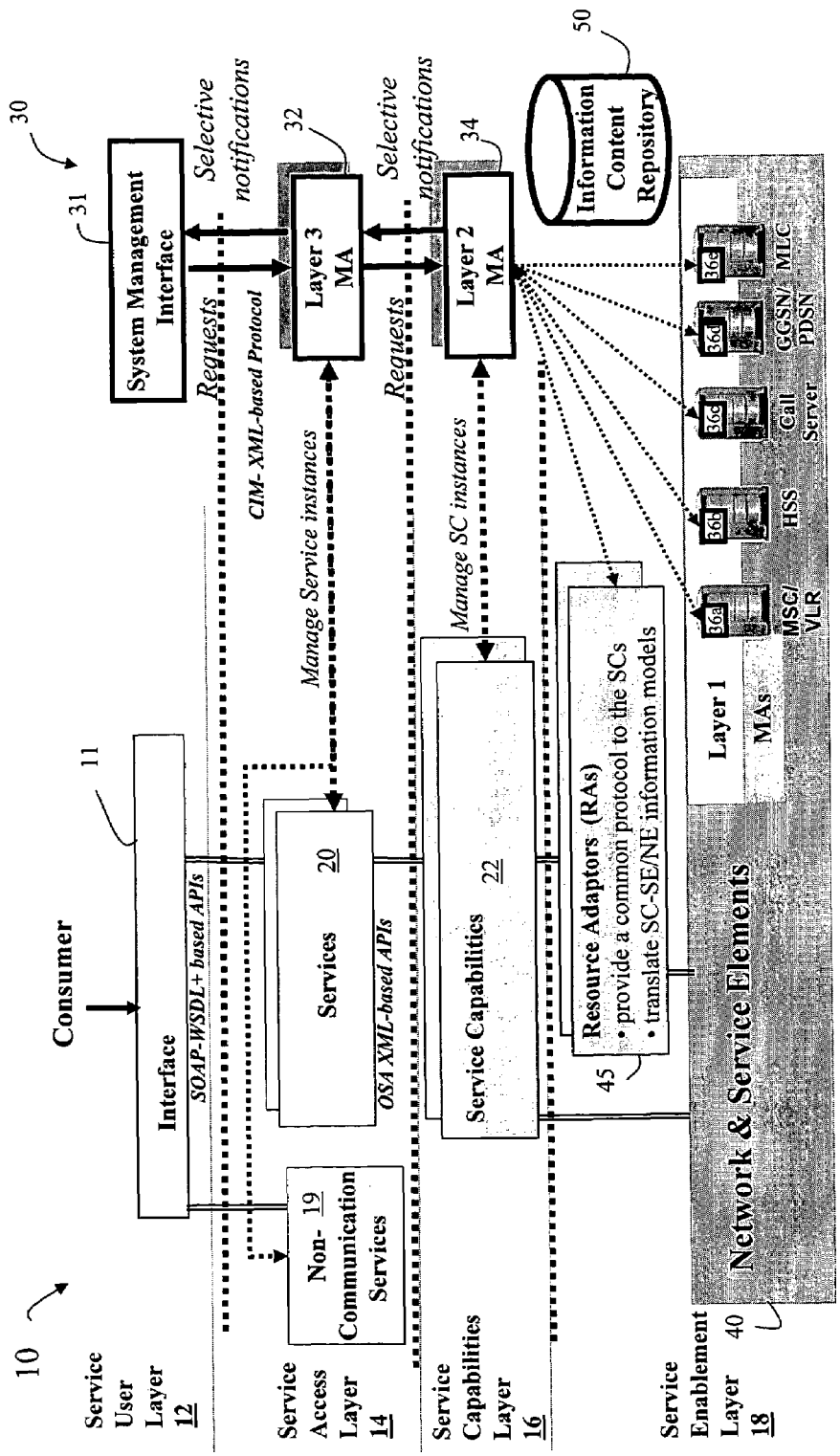
FIG. 1 is a block diagram of an aggregated service oriented architecture of the present invention.

Referring now to FIG. 1, aggregated service oriented architecture 10 is shown apportioned into a number of layers including a service user layer 12, a service access layer 14, a service capability layer 16 and a service element layer 18. The service user layer 12 includes an interface 11 by which a user (i.e., consumer, system administrator, etc.) can build a desired service. The service may be consumed via request and response-based messaging, using a Simple Object Access Protocol (SOAP) between the user and the service access layer 14, and the service being defined using a Web Service Description Language (WSDL). SOAP is an XML-based messaging protocol used to encode the information in Web service request and response messages before sending them over a network. WSDL is used to describe a Web service's capabilities as collections of communication endpoints capable of exchanging messages. WSDL therefore may be used to identify certain behavioral, reliability, lifetime, accounting and other characteristics of a desired service.

A service could be registered into a set of UDDI Web-based service registries using a UDDI-WSDL based representation.

The requests are passed to the service access layer 14. The service access layer provides services having the indicated characteristics, and controls access by the user to each of the generated service instances. According to one aspect of the invention, the services are an aggregation of service capabilities, communication and non-communication services 19 and 20, and logic that is self-managed as an autonomous unit and delivered with a service level agreement to a consumer (i.e., the subscriber who pays for the service, and the associated end-users, who consume/invoke the service). Each individual communication or non-communication service instantiation is referred to hereinafter as a service instance. The set of service instances has an interface with a set of externalized representations and bindings to a set of programming languages (e.g., for example JAVA™ (from Sun Microsystems, Inc., of Santa Clara, Calif.), C++ and C) and protocols (e.g., SOAP, SIP) with different transport bindings. A service could be registered into a set of UDDI Web-based service registries using a UDDI-WSDL based representation.

As mentioned above, a service and associated service instances 20 may provide functionality defined by one or more Service Capability and associated Service Capability instances 22 in the service capability layer 16. In general, the service instance 20 will access the service capability instance using the Application Programming Interface (API) associated with the Service Element (SE) (such as service element 40) hosting the desired Service Capability. Thus, the Service Capability layer is used to control accesses by the different Service Instances 20 to the various capability instances 22 available at the Service Elements 40 in the Service Enablement Layer 18.

A Service Capability Instance 22 uses the Service Elements 40 to perform specific actions to address a request from a user. According to one aspect of the invention, one embodiment of a Service Capability instance may be a Session Control Service Capability Instance, which attempts to meet specific Service Level Agreement (SLA) associated with the Service Instance session by monitoring the response time, setup time, packet loss, jitter and other performance characteristics of the Service Element associated with the Service Capability. In the event of state changes, SLA degradation or another type of alarm event, the Service Capability instance can forward an event to a coupled Management Agent (MA) [described in more detail below]. As will be described in more detail below with regard to MAs, each Service Instance/SC Instance may be linked or associated with a Management Agent. The MA allows the Service/SC to be an autonomous, self-regulating entity capable of dynamic self-management and self-healing behavior.

One aspect of the aggregated services architecture which assists the Service/SC in the performance of the above functions is the Information Content Repository 50. Portions of the Information Content Repository 50 are selectively accessible by each service layer (such as layers 14, 16 and 18). The shared repository stores content that is exchanged between the MAs, Service/SC instances and upstream management systems.

Figure 2:
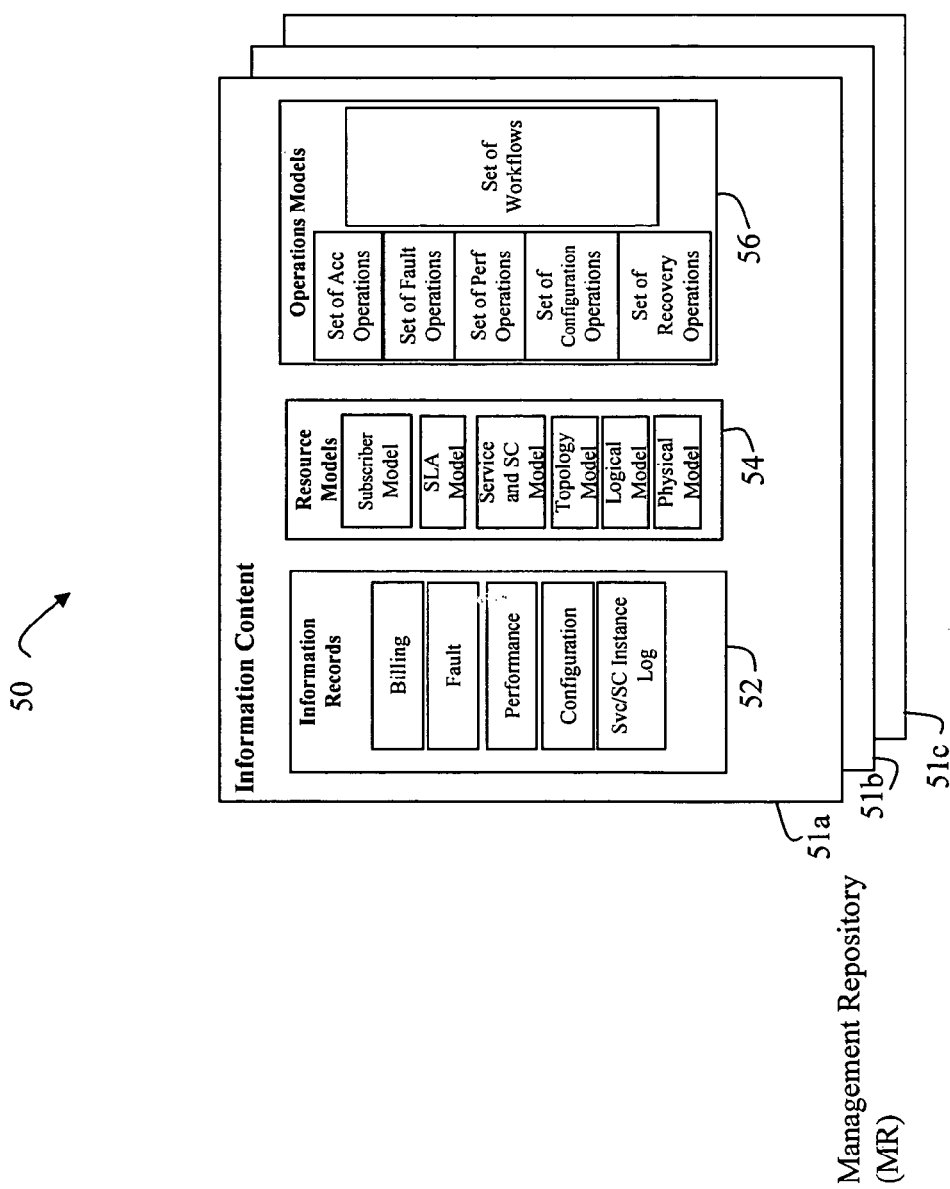
FIG. 2 is a block diagram provided for illustrating a variety of exemplary components that may be included in an information repository of the aggregated service oriented architecture of FIG. 1.

Referring briefly to FIG. 2, in one embodiment of the invention the Information Content Repository 50 is a distributed Database Management System (DBMS) comprised of a number of distributed Management Repositories (MRs) 51a, 51b, 51c, etc. In general, an MR is used to store information associated with and accessed by a particular service layer. Each MR 51a may include a set of Information Records 52, a set of Resource Models 54 and a set of Operation Models 56. The Information Record set 52 stores information related to service instances behavior (e.g., fault, subscribed and measured SLA and SLO, and billing information). The Information model set 54 may include a Subscriber Model, the Service Level Agreement associated with Service Instances in the service layer, Service and Service Capability Instance objects, and a Service and Service Capability aggregation hierarchy model including service topology and supporting network topology, logical topology and physical topology data.

The set of Operation Models 56 are those models that can be invoked, using available protocols and transports, to access the information records and information models. The set of operations may include workflows that invoke accounting, fault, performance, configuration and restoration/recovery procedures. The union of the Management Repositories, thus define the static and dynamic aspects of end-to-end services and associated instances. For example, SLA/SLO violation information about a service instance or service capability instance is associated with the corresponding issues/cause(s), and as a consequence an MR supports the ability to find from a given SLA/SLO violation set the corresponding issues/causes, as well as to find from a set of issue/causes (e.g., faults or alarms) the corresponding service SLA/SLO violations.

In one embodiment, each Management Repository only knows about services at its level and one level (layer) below, and each Management Repository serves all the Management Agents at its level, and the Management Repositories one level up.

Referring back to FIG. 1, the Service Enablement Layer 18 is shown to include a number of Network Element and Service Elements 40 which are available to provide the network or service capabilities for the Service Capability Instances. One or more Resource Adaptors 45 may be advantageously disposed between the Service Capability and the Network or Service Elements 40 to serve as an API and thereby enable a common protocol to be used by the Service Capabilities when accessing a Service Element (SE) or Network Element (NE). In addition, the Resource Adaptor may include logic for translating a common Service/SC information model into a model and format supported by the respective SEs/NEs.

According to one aspect of the invention, a hierarchy 30 of cooperating management agents is coupled to the service layers 14, 16 and 18. The hierarchy 30 of cooperating MAs uses common information models and protocols to automate service assurance, restoration and recovery, while facilitating integration of heterogeneous and multi-sourced services. The MAs are used by Service or Service Capability Instances to monitor SLA and QoE (Quality of Experience) compliance and to perform actions when SLA violations or failures occur. The hierarchical nature of the MAs also facilitate scaling and an extensible management architecture, thereby significantly reducing the TCO and OpEx for Carriers, Service Providers (SPs) and Large Enterprises. In accordance with one aspect of the invention, the Management Agents are linked to Service Instance or Service Capability Instances to provide functionality for tracking performance characteristics of the associate Service/SC. It is important to note that one MA is capable of managing thousands of Service Instance/Service Capability Instances. The functionality made available through an MA may include event registration, processing and publishing functionality, for example for processing a fault event, taking corrective action, or escalating a problem associated with diagnosis of a problem. The MA may also provide the Service/SC with functionality for pro-active monitoring of a SLA's Service Level Objective (SLO) violations and performance degradations, where an SLO represents a commitment to maintain a specific state of the SLA during an agreed period. The MA may assist the Service/SC in the dynamic diagnosis of performance or failure problems, for example to determine a set of possible causes for SLO violations. The MA may use local or global procedures for accelerated execution of dynamic restoration and recovery of the Service/SC which access information related to similar performance problems, associated diagnosis and recovery events, the aggregations of service instances within a service instance hierarchy, service instances' related SLA priority information, and a status of related service capability instances.

Other functionality may also be provided to the Service/SC instance by the MA. For example, the MA may provide the Service/SC instance with the capability to perform run-time verification of applied restoration and recovery procedures, as well as the capability to dynamically log events for auditing and support purposes and selectively share information with other service instances.

In general each Management Agent is associated with a given one of the service layers. Thus, a Management Agent which is used with network or service elements (Layer 1) is referred to hereinafter as a Layer1 MA or MA@L1. Similarly, an MA associated with the service capability layer is referred to as Layer2 MA or MA@L2, and an MA associated with the service access layer is referred to as an Layer3 MA or MA@L3.

Figure 3:
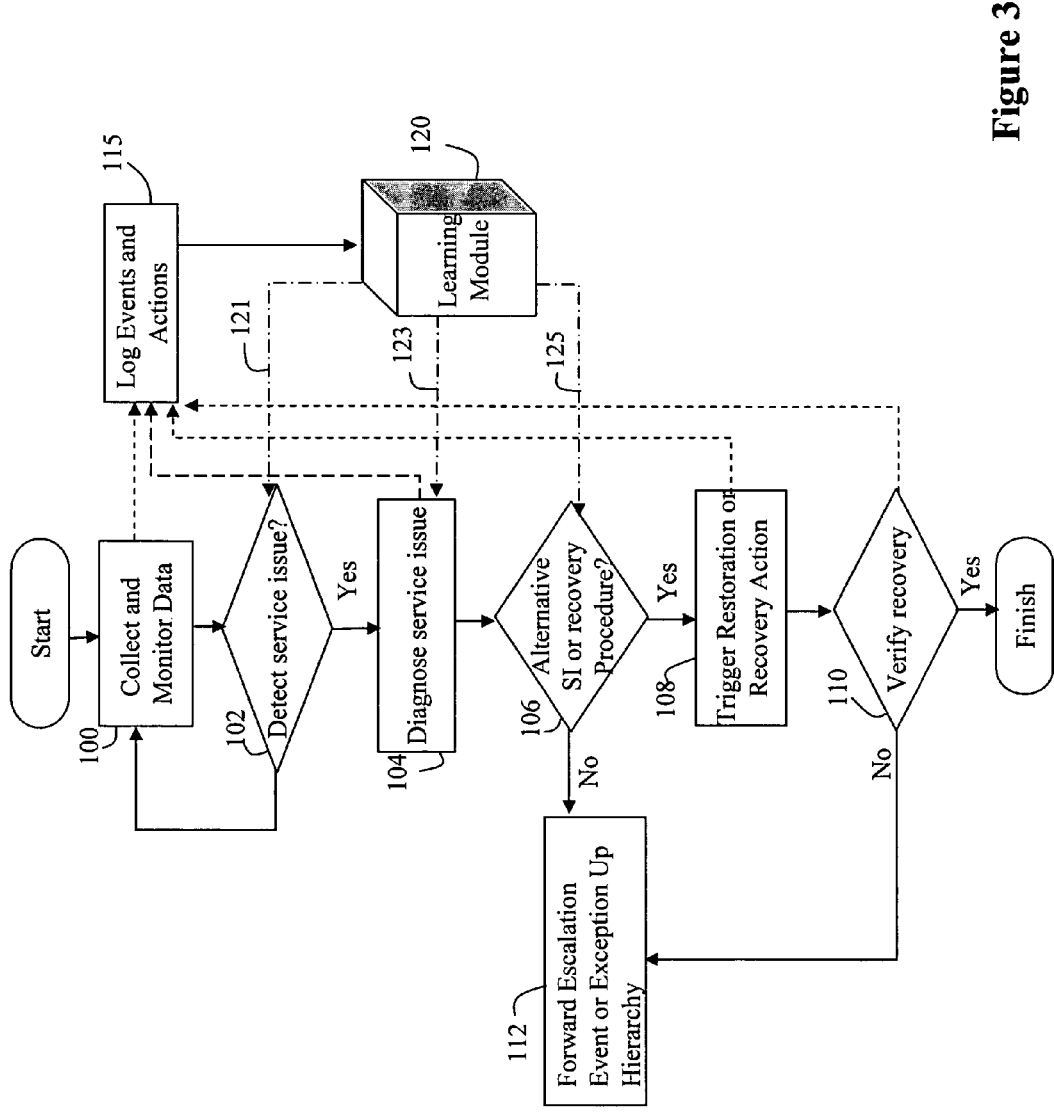
FIG. 3 is a flow diagram illustrating exemplary steps that may be performed to dynamically identify and self-heal a service in the architecture of FIG. 1.

Referring now to FIG. 3, a flow diagram is provided for illustrating how the aggregated Management Agents cooperate to enable dynamic self-healing of a service in the service oriented network of FIG. 1.

At step 100, at least one of the Management Agents in the hierarchy collects performance data associated with the service instance. For example, an MA could collect the performance measurement data requested by a higher layer MA in the hierarchy, where the higher layer MA may be for example associated with the service instance. Accordingly, at configurable time intervals, a service instance's MA could interrogate the adjacent and children MAs about specific SLO parameters (e.g., round-trip-delay, packet loss, etc.). The data may be analyzed internally at the MA or simply passed up the hierarchy.

Each MA may be programmed to detect certain service issues, such as service degradation or failure. At step 102 an MA may process the data collected at step 100, correlate the data and compare the collected measurements against specific SLOs of an SLA. If there is a mismatch, that for example exceeds the agreed variance, or an SLO threshold violation is detected, then the process proceeds to step 104 where the service issue is diagnosed.

At step 104, the MA uses service degradation and service failure effects and specific conditions as keys to look-up alternative Service Instances or procedures that may be used to remedy the failure. For example, a persistent catalog of effects-conditions-causes entries can be stored in an MR associated with the MA. The MA then uses the causes-conditions pairs as a look-up key into a catalog of alternative service instances or recovery procedures that may be triggered automatically. If a cause-condition pair does not exist in the catalog, then at step 112 either an escalation event is sent to a parent MA, or an exception is raised to request human intervention.

If, however, a cause-condition pair does exist in the catalog, then at step 108 the recovery or restoration is automatically selected and triggered in accordance with specific SLA-SLO goals. Thus the MA selects one of the identified causes, and applies an alternative service. When there are alternative services to be applied for a given cause, a cost-based decision algorithm may advantageously be used to optimize and accelerate the selection of the restoration/recovery (i.e., remedy) action.

The role of the recovery logic associated with an MA is to apply service restoration and recovery procedures. In one embodiment workflow management techniques are used in the design of the service self-management architecture to enable the automation of the recovery logic. Such an arrangement avoids hard-coding the set of actions to be taken, when either an SLO or an SLA are violated during a specific period.

A variety of event-driven workflow management enablers may be used to perform service restoration and recovery. For example, a commercial workflow management system (WFMS) that supports the JAVA™ 2 Enterprise Edition (J2EE) model from Sun Microsystems, Inc., and a standard-based business process execution language (e.g., BPEL) could by used. In such a design, an MA@L2 or an MA@L3 could send an event to an WFMS to enact a specific restoration & recovery processes. Similarly a JAIN Service Logic Execution Environment (SLEE) may be used. In such an environment, an MA@L2 or an MA@L3 could send an event to a JAIN SLEE to enact a specific restoration & recovery processes. A set of commercially available fulfillment, assurance and billing-based applications capable of being integrated, using an event model, with an MA@L2 or an MA@L3 could alternatively be used without affecting the spirit or scope of the invention.

At step 110, a verification process verifies recovery to pre-fault condition. In one embodiment, each remedy action has an equivalent verification procedure, as well as a compensating one to roll back, if required, the remedy action (i.e., restoration or recovery). Successful verification completes the recovery/restoration process.

It is noted that step 115 represents a logging activity that is performed by the MA. The MA logs events and actions with relevant context information for future statistical analysis & correlation in the MR. Logging happens in the background, and in parallel with the execution of the above activities, to record persistently all relevant aspects of a service instance activities' trail. For example, the execution of the remedy and verification actions and their outcomes may be logged persistently in the MR to support audit and service self-learning purposes. Advantageously, what gets logged can be adjusted and configured dynamically.

Also shown in FIG. 3 is Learning Module 120. According to one aspect of the invention, the MA is equipped with logic that enables the logged events and actions to be continually analyzed for the purpose of problem resolution. That is, the MA includes the capability to extrapolate past and present information to perform proactive and self-healing actions, while enabling learning of recovery methods. The trail of a service instance's activities and corresponding outcomes are organized and stored in the MR. Historical and current problems and related solutions are correlated and Best-Fit algorithms are used to optimize the selection and execution of services' self-healing alternatives.

Accordingly it can be seen that the MAs permit self management and dynamic self-healing through a distribution of common information content across MA hierarchy and by the distributed control through a hierarchy of cooperating MAs. While the MAs are described in FIG. 1 as an aggregate group, it is understood that each MA may be configured differently. MAs for L1, L2 & L3 could be implemented, for example, by inheriting from a common functionality and parametric software skeleton. As an example, functional aspects of an MA skeleton which could be parameterized include the MR's information content and scope to be accessed, the MA's north-bound and south-bound providers, events and filters types, the MA's exception handling mechanisms, and the MA's restoration and recovery processes. Such an implementation of MAs permits the control hierarchy of MAs to represent, in practical terms, an interaction of MAs with parameterized responsibilities. In addition, MAs are event-driven and policy-driven.

As mentioned above, one technology that could be considered for the implementation of a parameterized MA is the J2EE framework, which would interoperate with DMTF CIM WBEM, open source implementations, and naturally with the J2EE Connector Architecture (JCA) for providers or resource adaptors.

A detailed description of one method of deploying agents in the service architecture of the present invention will now be described. It should be noted that the below description and data structures are provided for illustration purposes only, and are not limiting in nature. Rather it is appreciated that other methods of implementing the self-healing behavior described in FIG. 3 may be substituted herein by those of skill in the art.

Figure 4:
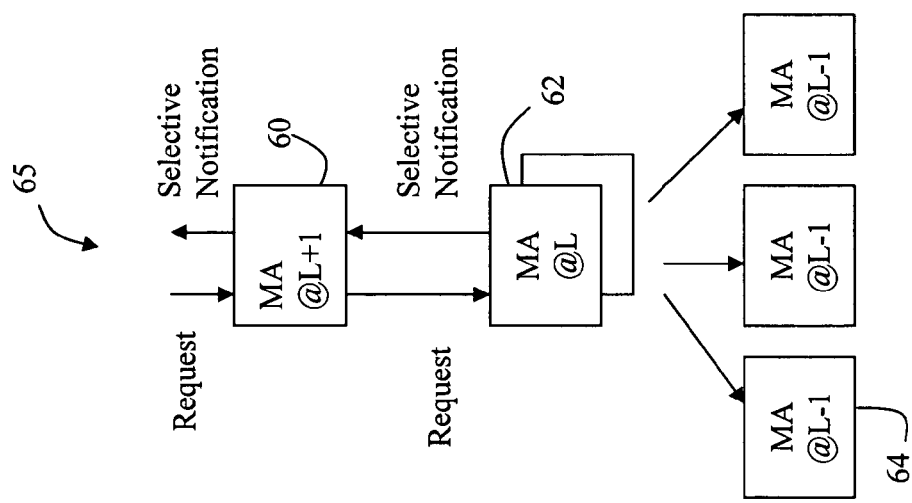
FIG. 4 is a block diagram illustrating message passing between cooperating management agents of the architecture of FIG. 1.

Referring now to FIG. 4, an exemplary hierarchy of Management Agents is shown. According to one embodiment of the invention, a Management Agent MA has some basic characteristics. A Management Agent at level L (MA@L) can act out 3 simultaneous roles: a) a client role for (aggregate) management agents at level L−1, b) a listener role for agents at level L−1, or c) server role for agents in level L+1. A client role performs asynchronous and synchronous method invocations on an MA located at level L−1. A listener role registers interest on a set of topics (and associated filters) and receives corresponding events or notifications. A server role (@L−1) responds to clients' requests (@L). Aggregate MAs (@L) could cooperate by exchanging information with upper MAs (@ L+1) and with lower aggregated MAs (@ L−1). An MA that detects a problem could attempt to solve it or to notify a (parent) MA about it, by sending a specific event (e.g., an indication, in DMTF CIM terminology). An MA may apply a local restoration service, for example, to avoid or to minimize service interruption. However, the parent MA may decide to undo what has been done, or to apply global and optimized restoration and recovery procedures. The ability to apply restoration and recovery procedures exist at all levels in the MAs hierarchy; but the higher in the hierarchy, places an MA, the greater is its responsibility and ability to apply a recovery procedure that has an end-end service reach and impact.

In order to support a scalable and extensible service management architecture, while enabling service self management, the hierarchy 65 operates under defined distributed control and cooperation rules. Management agents send requests top-down the layered hierarchy (i.e. MA @L+1→MA@L). Management agents send notifications or events bottom-up the hierarchy (i.e. MA@L→MA @L+1). The higher an MA is in the hierarchy, the greater its responsibility to address global restoration & recovery actions. Lower layer management agents address local problems, in a responsive manner to avoid service interruption and, if needed, send (escalation/alert) events to an upper (parent) MA. The MAs at the various levels cooperate to share information content including service statistics, SLO/SLA measurements, service instance status, diagnosis, and service information models, thereby facilitating the integration of nested services from multiple service suppliers.

In one embodiment of the invention, each Management Agent is an object represented, using an Object Oriented model in the MR, which can have associated therewith a variety of functions/methods and attributes. One example of an object oriented model which may be used to represent a service instance is a Common Information Model (CIM), developed by the Distributed Management Task Force, Inc. (DMTF). CIM is one standard for the exchange of management information in a platform-independent and technology-neutral way, streamlining integration and reducing costs by enabling end-to-end multi-vendor interoperability in management systems. The CIM also includes a number of standard models (data schema) for Systems, Applications, Networks and Device and other components, expressed in mof language. This standardization enables applications from different developers on different platforms to describe management data in a standard way so that it may be shared among a variety of management applications. A compiler, which acts as a WBEM client compiles the Managed Object Format (mof) code, and loads it into a WBEM server. The compiler may produce other output, including skeleton code for providers and user documentation.

One version of the CIM is provided by the Web-Based Enterprise Management (WBEM) standard. WBEM is a set of management and Internet standard technologies developed to unify the management of enterprise computing environments. The DMTF has developed a core set of standards that make up WBEM, which includes the Common Information Model. Although the below description will describe an architecture which uses CIM-WBEM objects, the present invention is not limited to any particular type of object format, and thus any other object oriented model (such as TMF SID) may alternatively be substituted herein.

In an embodiment where the CIM-WBEM objects are used, a CIM modeling construct such as a CIM_Service object may be used to model a Service or Service Capability as a subclass of it. Actions required to solve a service affecting problems could be modeled using the CIM_PolicySet (i.e., using events-conditions-actions). In one embodiment, the MA is modeled as a WBEM Server and Recovery Logic using a provider approach.

Each WBEM Server that models a Management Agent may include the following components: a CIM Object Manager (CIMOM), used to Broker between CIM Clients and Providers, Client Protocol Adapters for receiving client requests, Indication Handlers for sending indications, associated with events, to subscribers, Providers for performing protocol and data translations to support client requests, and a Management Repository for storing the management models and instances used by CIMOM. In addition, each WBEM server that models a MA includes Recovery Logic. As described with reference to FIG. 3, the Recovery logic includes functionality for Event Subscription/Publishing, Event Logging, performing Basic Diagnosis, performing Local Fail over, Restoration, and Recovery and functionality to Enable/Disable management control.

In a carrier grade environment, the WBEM servers may be augmented to include support for distributed transaction control across a hierarchy of WBEM servers to enable correlation of interleaved synchronous and asynchronous requests from clients to an MA, with related synchronous and asynchronous responses from the servicing MA. For example, an MA's CIM Object Manager could use a transaction id, as context information, to correlate received requests and related responses.

A carrier grade WBEM server includes bulk-like atomic operations, to provision, restore and recover services deployed on several Service Elements (SEs), as well as support for mapping methods to store and retrieve the object models and objects to/from an MR. In addition, a carrier grade WBEM server includes support for secure and reliable distribution & interactions of WEBM and (CIM) providers on different hosting platforms.

Although the above describes exemplary functionality that may be included in a WBEM server for an MA, it is noted that each Management Agent for each layer may have different responsibilities. The differences in responsibilities between the MAs will now be described with regard to FIGS. 5, 6 and 7.

Figure 5:
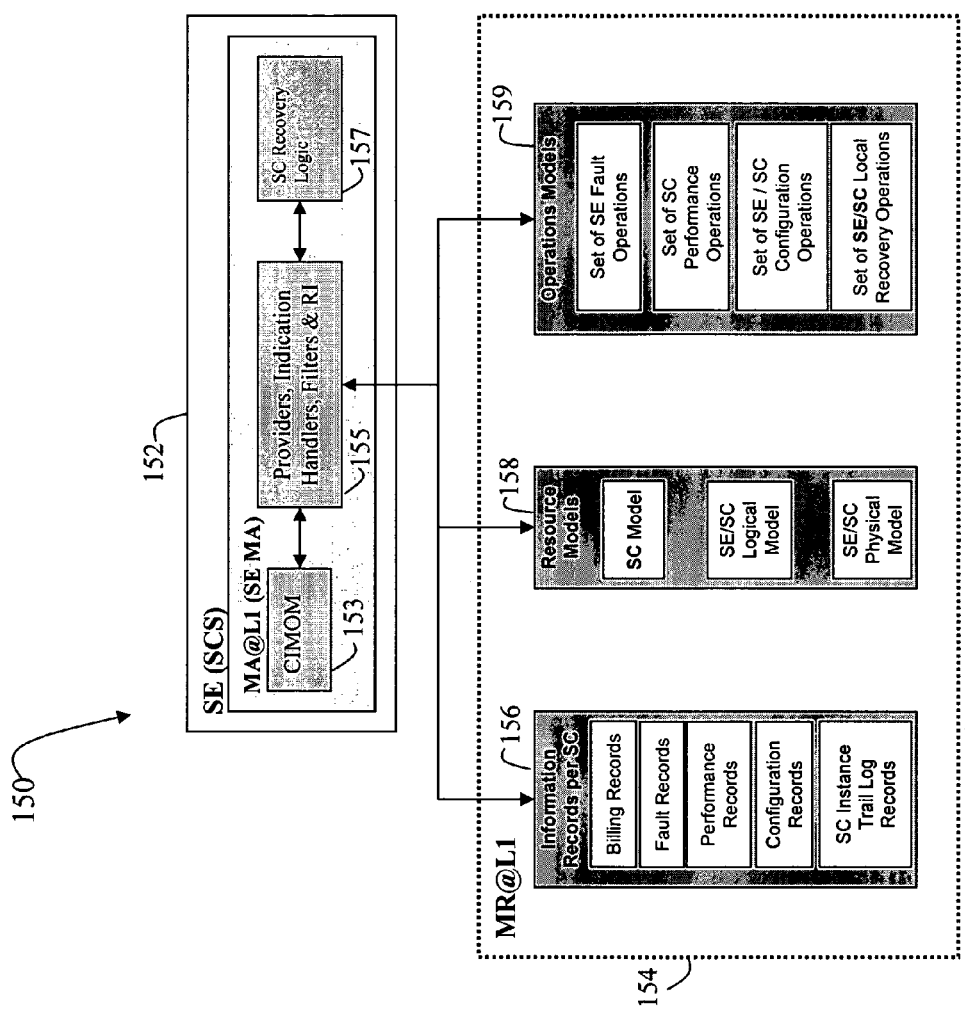
FIG. 5 is a block diagram provided to illustrate several exemplary components that may be included in a management agent in a first level of a hierarchy of management agents.

Referring now to FIG. 5, a Layer1 Management Agent 150 is shown to include a number of agent components 152 and a number of Management Resource (MR) components 154. In general an MA@L1 is responsible for local management of an associated SE. Thus, the MA@L1 should include the capability to Commission, Configure, and Provision the SE's SC. The MA@L1 should also include the capability to enable the discovery of SE's physical and logical resource models. In addition, the MA@L1 should include logic for restoration and recovery of SC instances, if applicable.

The MA@L1 services requests from local Service Capability instances or associated MAs@L2, and posts billing related events, if applicable. In addition, the MA@L1 includes event handling and filtering capability due to SE/SC/SC instance failures, SE/SC/SC instance performance degradation, or for escalation purposes. Thus the MA@L1 escalates alarms when required to an MA@L2 and logs SC instances trail to the MR@L1.

The MA@L1 should be able to access service capability instance management information from Providers to the SE's logic and updates SC instances' information in the MR@L1. As such it should include the ability to interact with a Service Capability Register (SCR) to gather performance information about SC instances, and performs Diagnosis & related information gathering. The aggregate functionality of the agent 152 is represented by components 153, 155 and 157 in FIG. 5.

According to one embodiment of the invention, the CIM-XML protocol is used between an MA Client (e.g., MA@L2) and an MA Server (e.g., MA@L1). The Common Manageability Programming Interface (CMPI) is used to communicate between an MA@L1 and its providers. Events could be modeled according to the CIM Event Model—DSP107. The Broker logic is represented by block 153 in FIG. 5.

In general, the resource models used by the MA@L1 include an SE's physical and logical models and SC model and associated instances. The Operation Models used by the MA@L1 include SE's, Fault, Configuration, Accounting, Performance, and Security Management (FCAPS) related operations per SC instance (SCi), including SE/SC/SCi Recovery & Restoration operations. The Information Records should also include FCAPS related information records and SCi trail logs.

Figure 6:
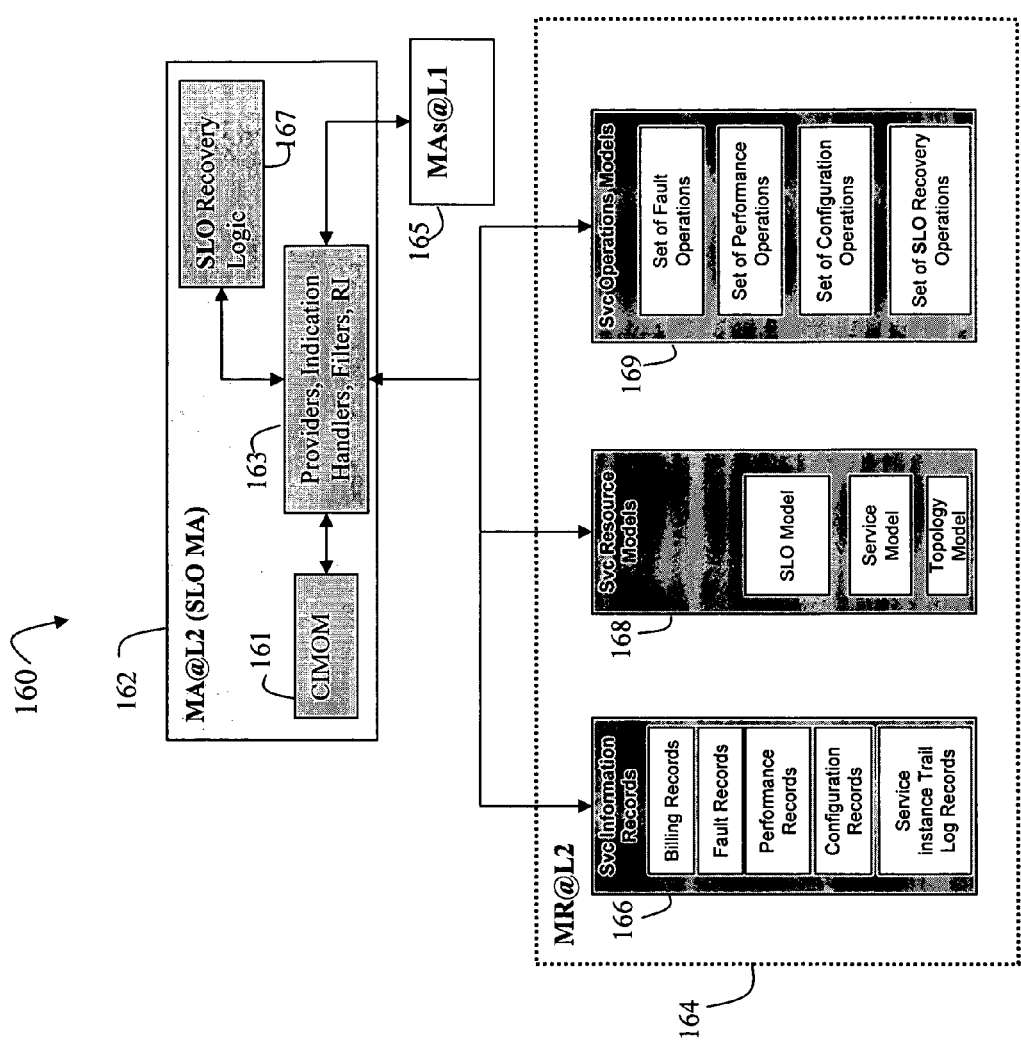
FIG. 6 is a block diagram provided to illustrate several exemplary components that may be included in a management agent in a second level of a hierarchy of management agents.

In one embodiment, events at the SE related to the MA could be modeled using the CIM Event Model DSP107, where a client registers to receive indications upon the occurrence of an event. The Layer1 MA is associated with an SE, and may be hosted by the SE or alternatively hosted in clustered servers to support replication and fail-over. In addition, a supplier of NEs or SEs could use a Proxy to host a MA@L1 (P-MA@L1) to enable the plugging-into the described apparatus. An P-MA@L1 could interact with a designated serving MA@L1, hosted in another SE/NE, or could also interact directly with a designated MA@L2. Referring now to FIG. 6, a Layer2 Management Agent is shown. In general, the Layer2 MA performs SLO management for a set of Service Capabilities & associated Service Capability instances (SCis).

The MA@L2 is shown to include agent functionality 162 and a MR database 164. The responsibilities of the MA@L2 are shown by via a collection of components 161, 163 and 167. The responsibilities complement those of the MA@L1. For example, the MA@L2 monitors, restores and recovers specific SLOs across a set of SC instances. It interacts with a set of MAs@L1 165 to guarantee specific SLO metrics (i.e., thresholds, ranges) during a given period, and escalates alarm conditions to an MA@L3. The MA@L2 logs & accesses SLO related information to/from MR@L2, and enables the discovery of supporting network topologies and service aggregation information models.

In one embodiment the CIM-XML protocol may be used to control communications between an MA Client (e.g., MA@L3) and a MA Server (e.g., MA@L2), and between self and an MA@L1 165. The CMPI protocol may be used to exchange information between a MA@L2 and its providers.

The Service Resource Models in the MR@L2 contain network topologies, and Service Resource Models, and SLO models 168. The Operation Models stored in MR@L2 include Service management operations models 169. The Information Records include FCAPS related to SLOs per service instance and Service instance trail logs 166.

As with the Layer1 MAs, Layer 2 MA events are modeled according to the CIM Event Model—DSP107. Layer2 MAs can be deployed in a variety of manners including in clusters to support management scalability, restoration & hot-standby fail-over, and recovery mechanisms.

Figure 7:
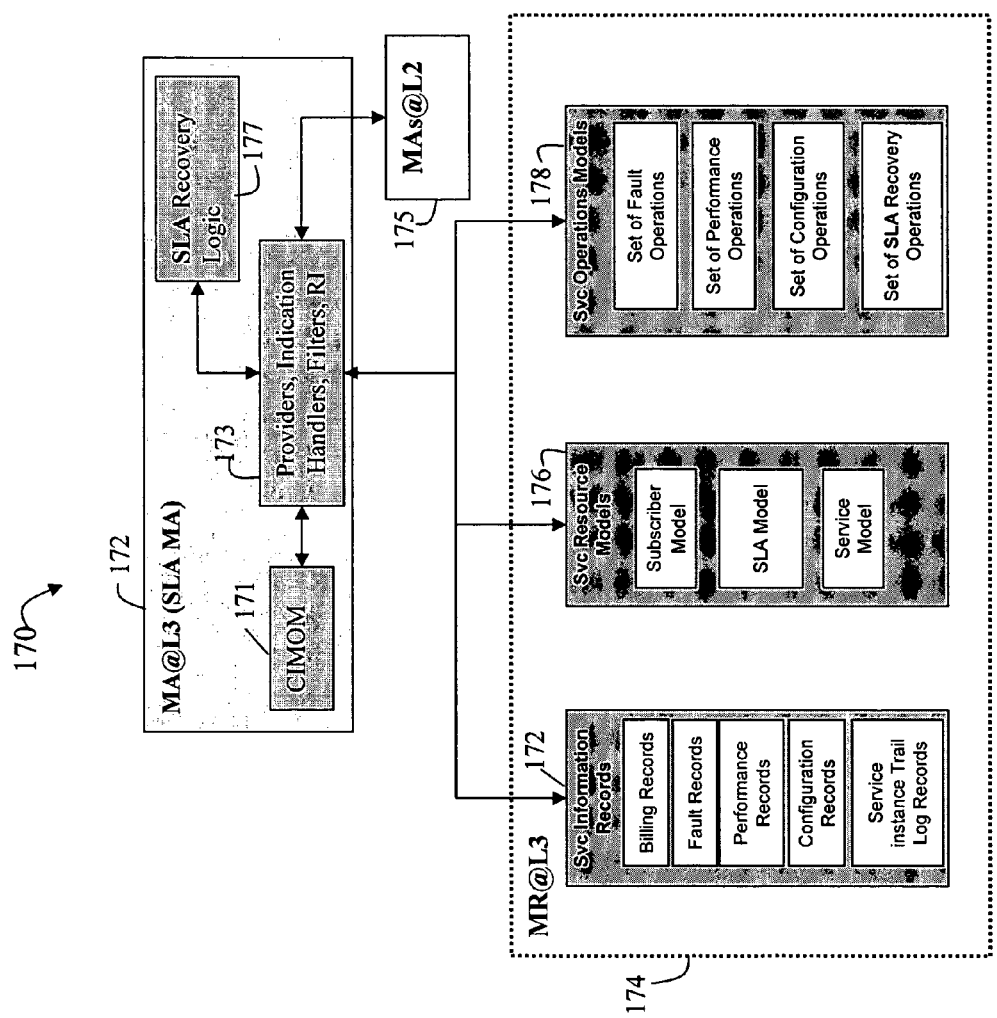
FIG. 7 is a block diagram provided to illustrate several exemplary components that may be included in a management agent in a third level of a hierarchy of management agents.

Referring now to FIG. 7, a Layer3 Management Agent is shown to include agent functionality 172 and a Layer3 Management Repository (MR) 174. In general the Layer 3 MA performs SLA management for Services and associated Service Instances. In order to perform this task, the MA@L3 includes a variety of capabilities, illustrated as functional components 171, 173 and 177 in FIG. 7. These capabilities include the ability to extend MA@L2 functionality by pro-actively monitoring, restoring and recovering specific SLAs. In addition, the MA@L3 includes logic to aggregate, filter and correlate information from MAs@L2, Service instances or SLA Apps. The MA@L3 logs and accesses SLA information to/from MR@L3 and services requests and escalates alarms from/to SLA management applications. The MA@L3 supports distributed transactions and session control across MAs@L2-L1. It also interacts with OSSs and Business Support Systems (BSSs) for subscriber SLA & QoE compliance and billing purposes.

It is important to mention that MAs could not only interact within their hierarchy, but could with MA peers within the same management layer. The MAs peer-peer-based interactions may accelerate the diagnosis of local problems and the triggering of required restoration and recovery mechanisms.

According to one embodiment of the invention, a CIM-XML protocol is used to exchange information between a Client (e.g., OSS/BSS/SLA App) and an MA Server (e.g., MA@L3), and between self and an MAs@L2. In addition, the CMPI protocol is used for communications between a MA@L3 and its providers.

The MR@L3 includes Resource Models for supporting service models, SLA models and references to subscriber resource models. The MR@L3 includes Operation Models for performing Service management operations. In addition, the MR@L3 includes Information Records comprising FCAPS related to SLAs per service instance and Service instance trail logs 172.

As with Layer1 and Layer 2 MAs, events may be modeled according to the CIM Event Model—DSP107. However, the Layer3 MA event types should satisfy the event definitions from SLA Apps, NMSs, OSSs and BSSs. Layer3 MAs can be deployed as server clusters to support management scalability, hot and standby fail-over, restoration and recovery mechanisms.

Thus the Layer1, Layer2 and Layer3 MAs having the above capabilities may cooperate to provide a self-managed, dynamic self-healing service environment. It is commonly desirable that the service environment be suitable for carrier grade networks. It should be noted that the deployment of MAs in a carrier grade environment should be gradual to ensure that proper connectivity between the hierarchy of MAs is supported during deployment.

Figure 8:
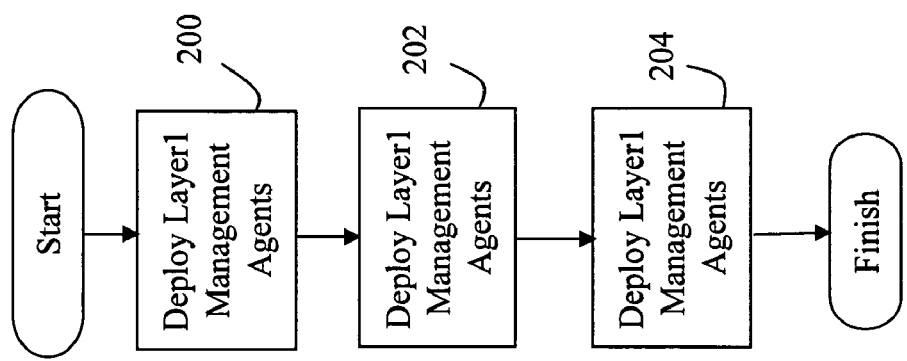
FIG. 8 is a flow diagram provided to illustrate one method of deploying management agents in an architecture of FIG. 1.

One method of deploying MA in a carrier grade environment will now be described with reference to FIG. 8. At step 200, MAs@L1 (i.e., SE MAs) are first deployed. Primary deployment of the MAs@L1 is advantageous because MAs@L1 include functionality enabling the discovery and management (i.e., fulfillment and assurance operations) of SE's, SCs and associated instances. In addition, the MAs@L1 are the entities responsible for information and protocol adaptation to a common information model and protocol. That is, while the south-bound interface (SBI) of an MA@L1 may interact with a set of protocols and information models, its north-bound interface (NBI) supports a common information model and protocol.

At step 202, MAs@L2 are deployed. An MA@L2 could be deployed, for example, in an OSA/Parlay Gateway and its API could externalize as a Management Service Capability (MSC). A cluster server could host, in a hot-standby fault tolerance manner an MA@L2. At step 204, MAs@L3 are deployed to support SLA management and QoE management.

It is also possible to consolidate the SLO and SLA management functions in one MA, in which case, 2 types of MAs may be used to support services self-management and self-healing.

Figure 9:
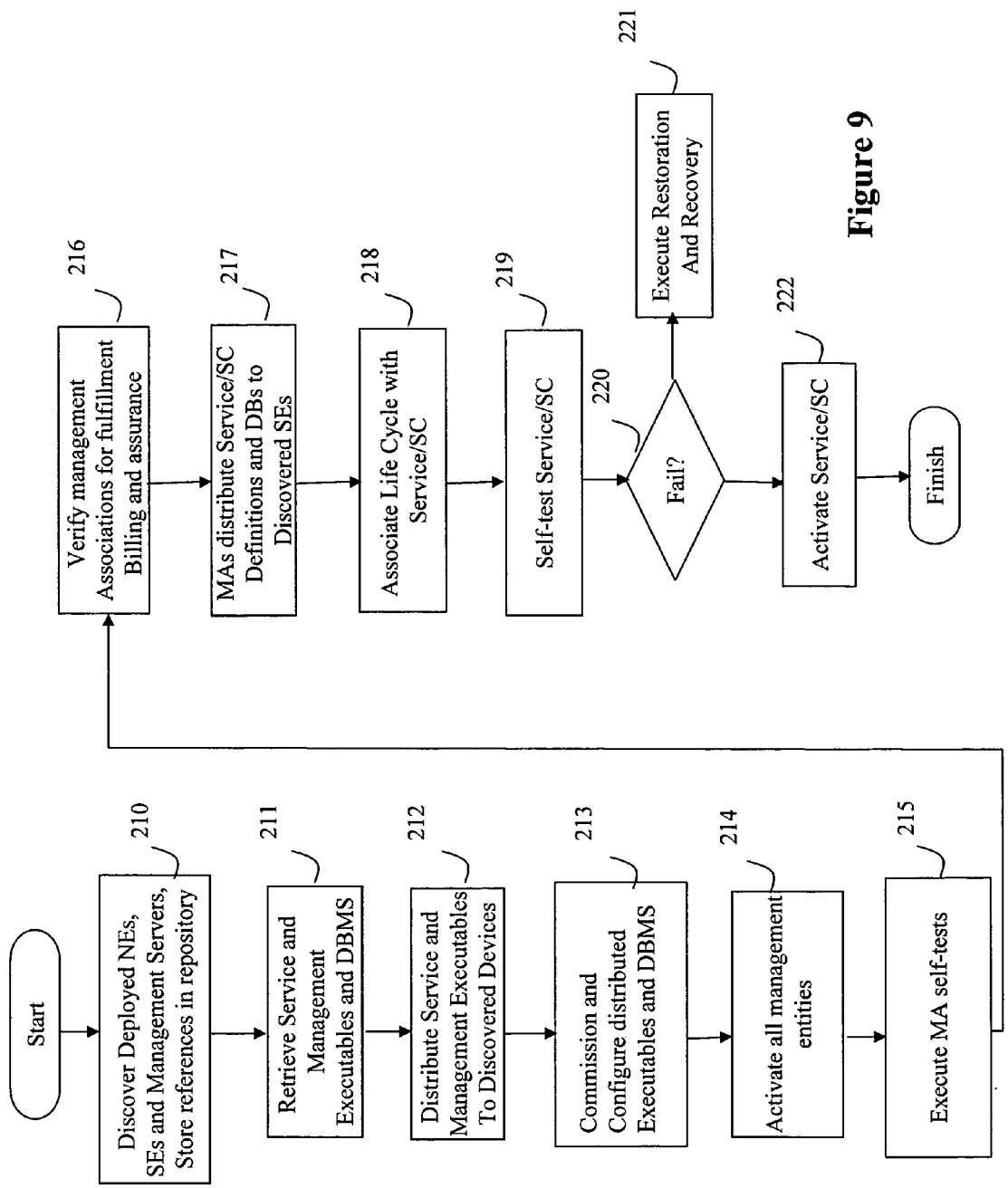
FIG. 9 is a flow diagram provided for illustrating exemplary steps that may be performed to integrate a service into the architecture of FIG. 1.

Once the initial MAs are deployed, the process of building services into the network is initiated. An exemplary process which may be executed by a system management application for integrating a service into a self-managed service oriented architecture of the present invention is shown in FIG. 9. Note that this process, or portions thereof, can be used at system initialization or during run-time as new Services/SCs are added to the service portfolio.

At step 210 the deployed NEs, Service Elements & Management Servers are discovered, and their references are stored in a persistent repository (i.e. service elements inventory repository). At step 211, the service & management executables and associated DBMSs are retrieved, and at step 212 they are automatically distribute them into the elements, discovered at step 210, using as input a service & management distribution and installation map. At step 213, the system management application commissions and configures the distributed executables and associated DBMSs to the respective SE. In one embodiment, an MA could be configured to manage a service or a set of services. At step 214, all the entities responsible for management are activated. Advantageously, during this step the heart beats-based health mechanisms are also activated. At step 215, the MA automatically executes the MA self tests. At step 216 the system management application verifies that schemas for Services & Service Capabilities to be deployed include management elements for Assurance, Billing and Fulfillment classes. At step 217, the MAs distribute the service/service capability definitions, as well as associated run-time databases (DBs) to the Service Elements that they manage, using the discovered SE & NE references from step 210. At step 218, Life Cycle Service Commissioning and Deployment is used to configure the distributed Service/SC executables using related subscriber information referenced in the management repository. At step 219, the Service/SC is run in self test mode. At step 220, it is determined whether the Service/SC fails the self-test. If so, then at step 221, the recovery/restoration process associated with the service is invoked to diagnose the problem with the service. However, if the self-test passes, then at step 222 the configured Service/SC is activated and available for use by a consumer.

Figure 10:
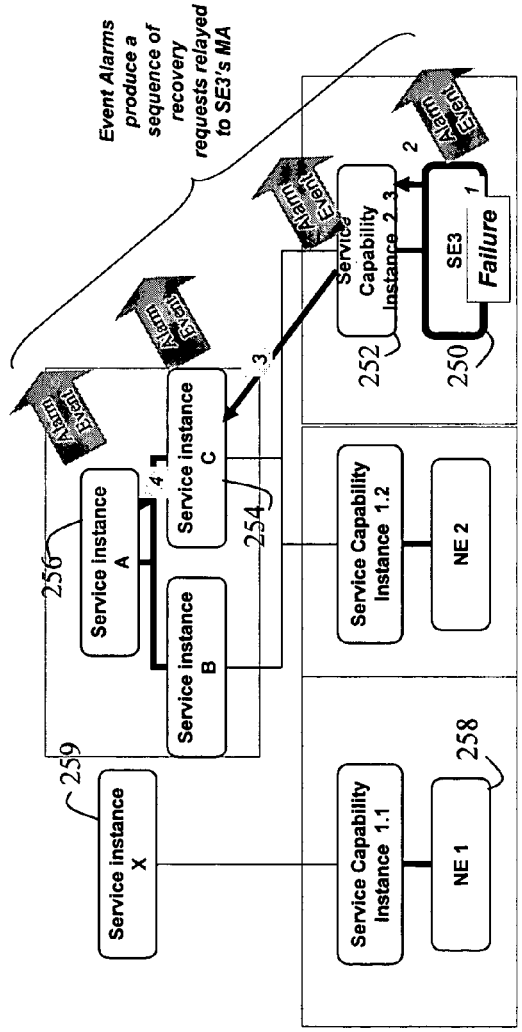

When the Service/SC management support is in place, the MAs autonomously monitor the NEs, SEs, SLAs and SLOs to identify undesirable conditions, and to dynamically self-heal the service upon the detection of these conditions. In one embodiment, the identification of an error is referred to as an 'alarm' condition. Each Service, SC and associated instances or SE have a composite alarm state object stored in the MR. As shown in FIG. 10, an alarm occurrence at a child element in the hierarchy is forwarded up the hierarchy to its parent. The passing of the alarm condition occurs until the alarm state is indicated at the top layer Service Instance. At this point, the SI needs to locate the alarm condition, and determine how to best respond to the condition. It should be noted that the SI may receive, at any time, a number of alarms, and thus the SI should include the capability to determine which SE alarm is the most important based on impacted SLAs, when multiple low level alarms occur simultaneously. In addition, it is desirable to avoid propagating unneeded alarm events to up-stream management systems to thereby avoid unnecessary recoveries.

Figure 11:
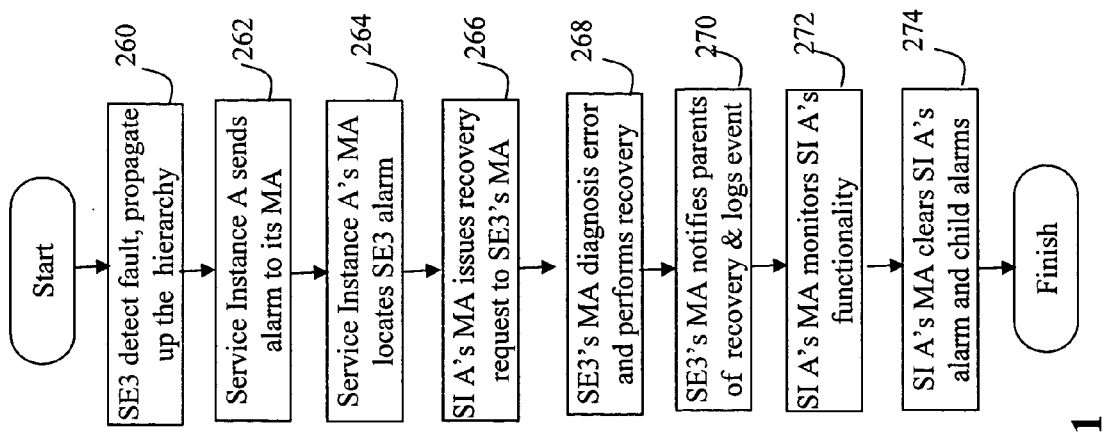
FIGS. 10 and 11 are a block diagram and flow diagram, respectively, provided to illustrate a propagation of alarm events up a hierarchy of management agents in the architecture of FIG. 1.

According to one feature of the invention, a child SE executes a recovery function if the recovery is indicated by an upstream parent component. An exemplary method of recovering a device while ensuring that unnecessary recoveries are not performed, will now be described with regard to the flow diagram of FIG. 11. At step 260 SE3's MA (250) diagnosis function identifies a fault condition, and propagates this alarm up through SC 252 and Service Instance C 254 to Service Instance A 256. At step 262 Service instance A sends an alarm event to its associated MA (A's MA). At step 264 Service Instance A's MA retrieves Service instance A's aggregation information from a Management Repository (MR), which is the one that A's MA is configured to access, and parses the aggregation information, until it finds the lowest SE/NE that has alarm event associated with it, recorded in the MR@L1. In the example of FIG. 10, the MA@L3 finds that SE3 has sent an alarm. At step 266 Service Instance A's MA requests SE3's MA to diagnose and to recover. At step 268, SE3's MA (MA@L1) performs the diagnosis and applies the recovery function. At step 270 SE3' MA sends a notification to its upper MAs, and logs what happened in its MR. At step 272, Service Instance A's MA monitors that the Service Instance A is functional. When Service Instance A is functional, at step 274 Service Instance A's MA "clears" the A event alarm and requests its children MAs (for Service Instance 254 and SC 252) to "clear" their alarms.

Note that other MAs, in between A's MA and SE3's MA could have also received alarm events, and would have dealt with the events in the same way as A's MA did by requesting SE3's MA to diagnose and to apply the recovery function. Note that SE3's MA need not diagnose an event each time that it is requested to do so, because it recorded in its MR what was requested, why was requested, and what it did about it, and may simply forward this data onto to subsequent requestors.

Note that the alarm recovery request need not always be handled in this manner. For example, when the SI A's MA request for diagnosis and recovery of SE3's MA is forwarded to SE3 through SI C's MA at step 266, SI C 254 may choose to ignore the request and avoid propagating the request to the child. This may occur if SI C's MA has previously sent the recovery request to the child SC 252. Thus, the MAs ability to store previously forwarded events enables redundant recoveries to be avoided. In addition each MA@L3 accesses SLA-based information to address which alarm should be given priority. For example, assume that component NE1 component 258 fails at the same time as SE3 250. In such a situation, NE1 sends an alarm event to the MA@L1, which also manages SE3 & SC 252. Service instance X 259 sends alarm event to its associated MA, which is the same MA as that associated with Service instance A. The SLA associated with the service instance X is bronze, and the one associated with A is gold, then the X's MA, which in this example is the same as A's MA, determines that it has to send a priority request to NE1's MA, which in this example is the same as SE3's MA, to recover 1st the gold SLA service instance. It is important that note that timing in this use case plays a critical role and that a priority request may or may not be granted depending whether the MA@L1 started already to recover the service instance X associated with the bronze SLA.

Figure 12:
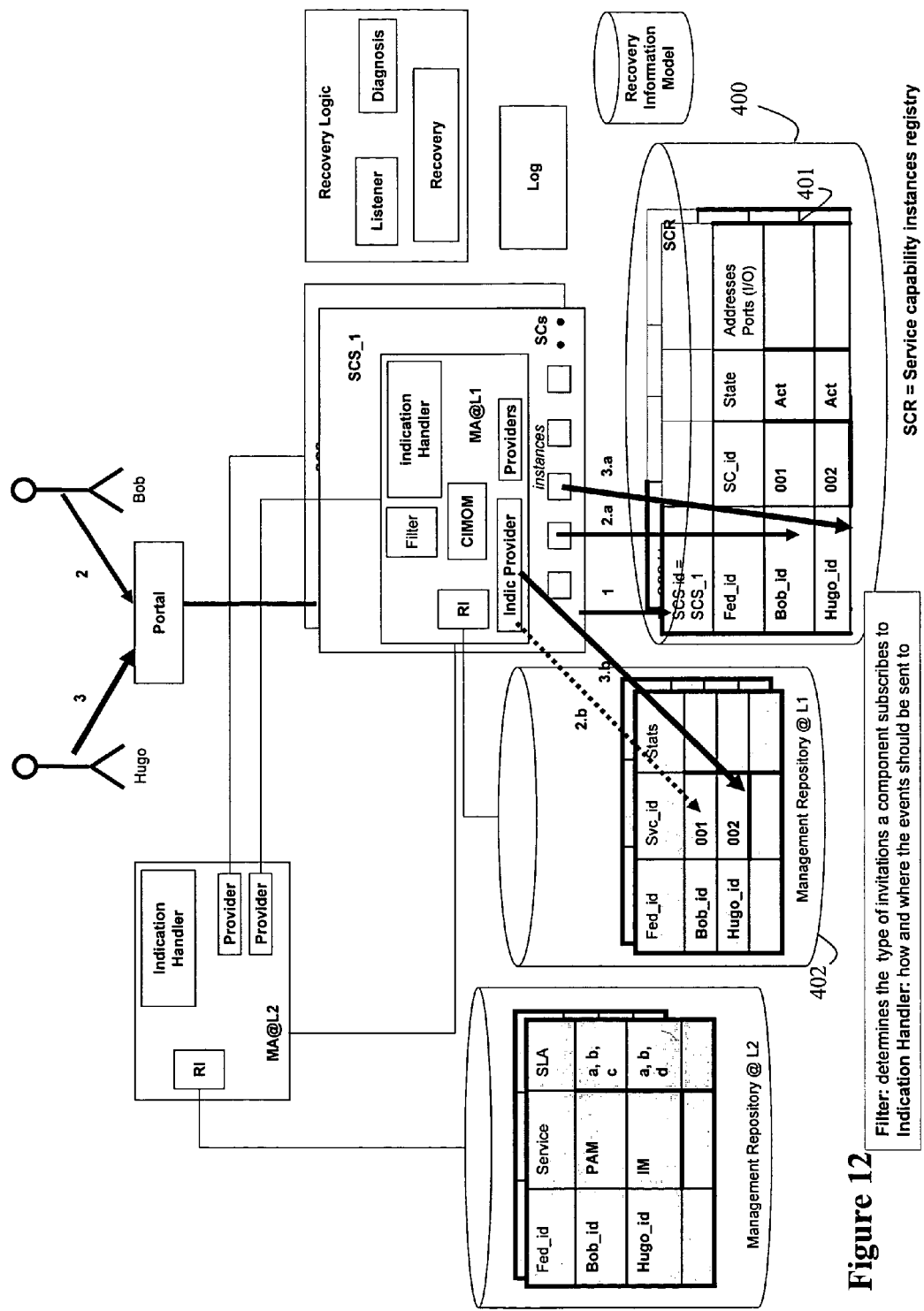
FIGS. 12 and 13 are system diagrams which are used to illustrate the registration and subsequent failure and recovery of a service used in a system designed in accordance with the principles of the present invention.
Figure 13:
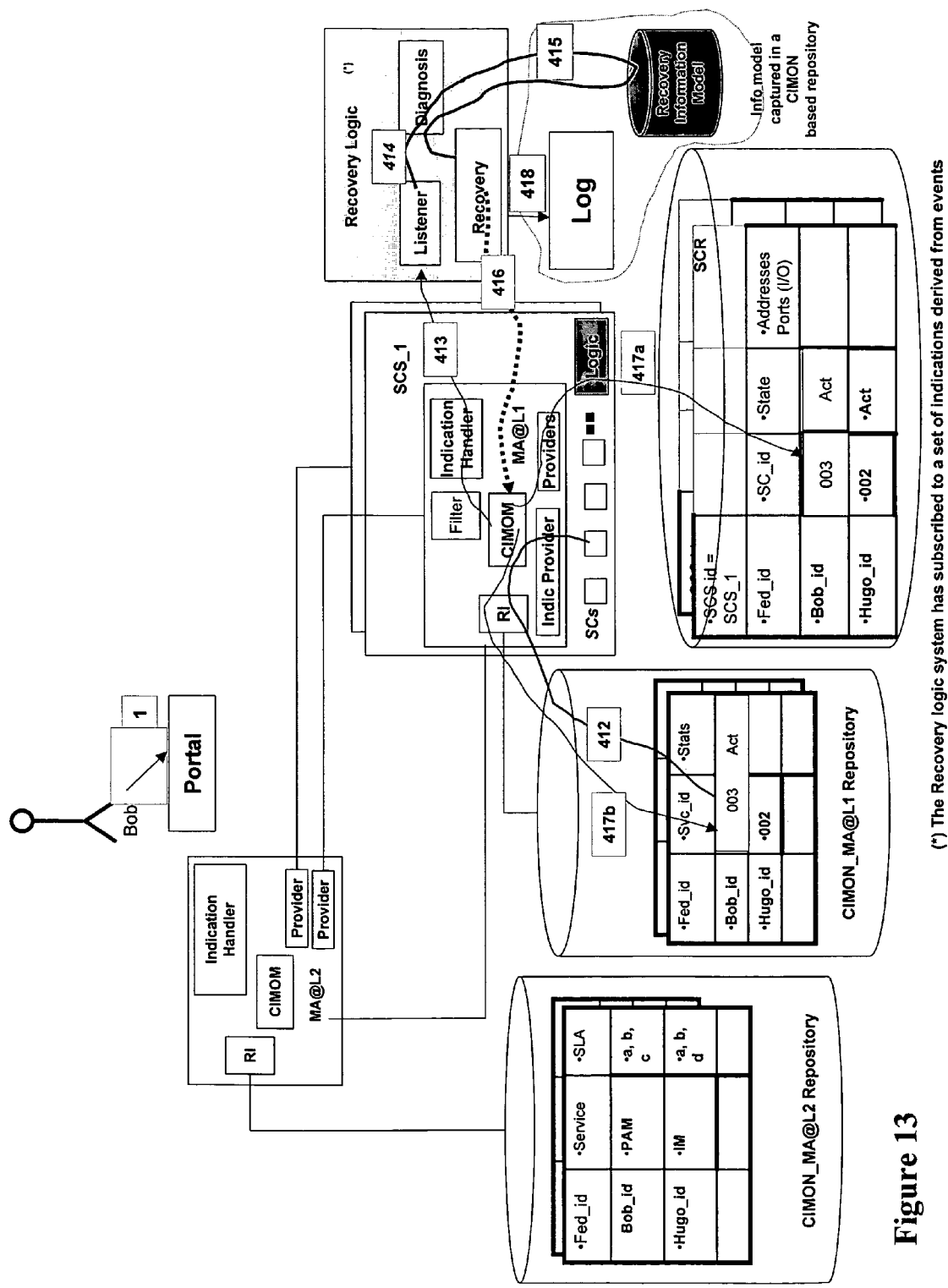

Referring now briefly to FIGS. 12 and 13, an example is provided for illustrating the interaction of components and the cooperation of management agents supporting dynamic self-healing, in the event of a service failure.

In FIG. 12, assume that a Service Capability Session (SCS_1) registers with the Service Capability Register 400. Subsequently, a user, Bob starts a session. The SCS adds a service capability instance 401 in the SCR (event 2.$a$). MA@L1 402 creates an entry in its repository (event 2.$b$). Then Hugo starts a session which triggers the generation of a service capability instance in the SCR (event 3.$a$), and the creation of an entry for Hugo in the MR (event 3.$b$).

Referring now to FIG. 13, assume Bob's session fails. Each of the next steps in the process is indicated via a numbered line in FIG. 13. At step 412, the logic of SCS_1 sends and event to its MA@L1 Indication provider and the MA@L1 updates its management repository. At step 413, MA@L1 for SCS_1 sends an event to the Recovery Logic, who has subscribed for that type of events. At step 414, the MA@L1 diagnoses the cause for the failure using a Diagnosis Information model. At step 415, MA@L1 then searches for an appropriate set of recovery functions. At step 416, the recovery Capability Requests the MA@L1 to apply a recovery method. At step 417$a$ the SCS_1 applies the remedy using the Provider that the CIMOM MA@L1 finds associated with the corresponding managed element. At step 417$b$ the SCS_1 applies the update in the CIMOM repository. At step 418 the Monitor of the MA@L1 logs the set of related activities.

Figure 14:
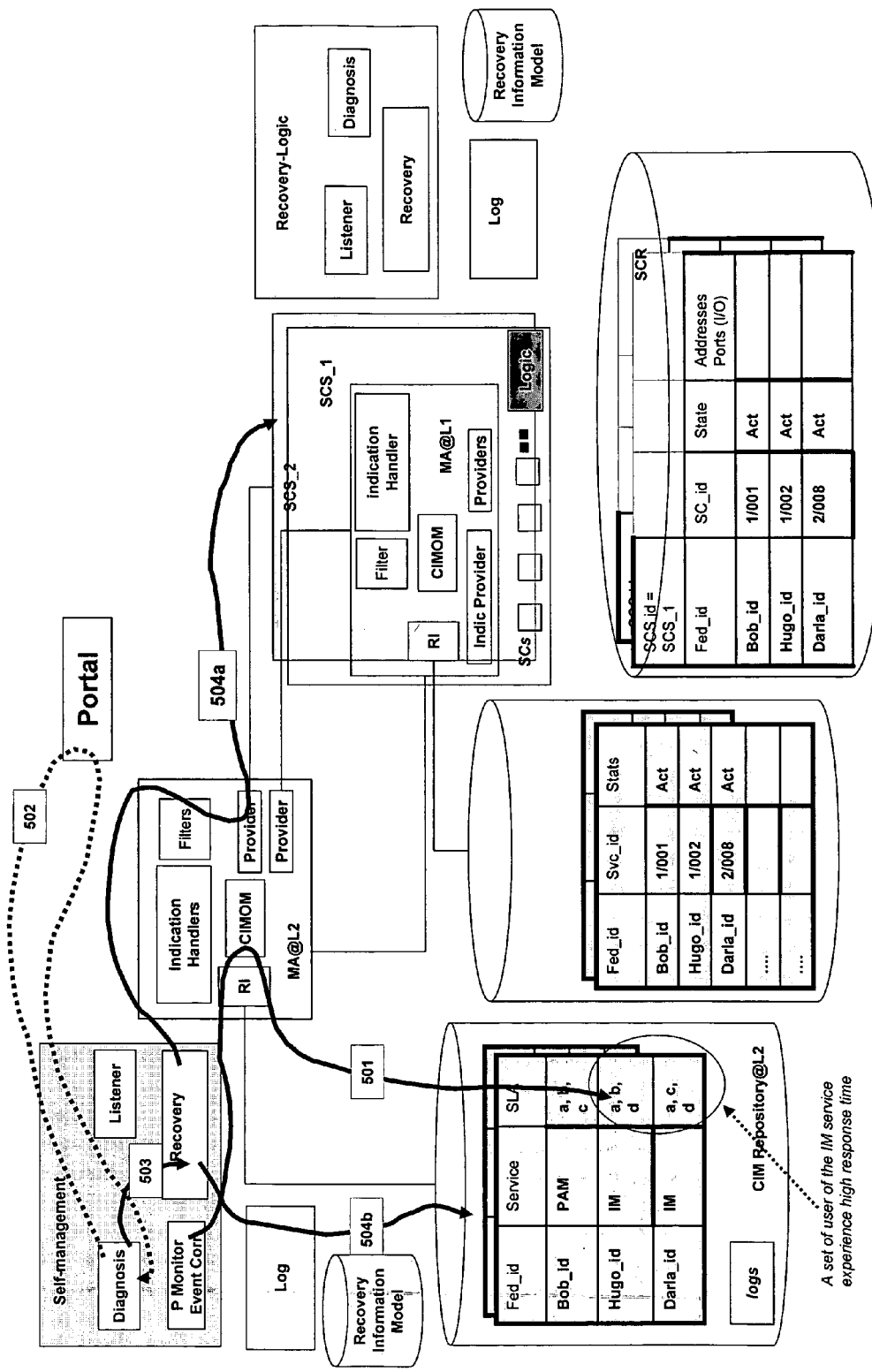
FIG. 14 is a system diagram which is used to illustrate a method of proactive service monitoring wherein the management agents use sampling techniques to identify degradation in system performance.

Referring briefly to FIG. 14, a proactive service monitoring capability of the present invention will now be described, with each of the lines of FIG. 14 indicating various steps which may be performed in the process.

At step 501 the Monitor Agent@L2 takes samples for specific services, and detects service degradation in instances of the IM service. At step 502 the MA@L2 diagnoses the problem by executing dummy requests for IM & Location and determines that an IM server is out of service, overloading and causing congestion on the remainder IM servers. At step 503 the diagnosis function reports the problem and causes to the recovery function. At step 504$a$, the recovery function activates a new cluster of IM servers, using a MA@L1, and at step 504$b$ it logs the problem, solution & time into the CIM based repository, shared by all the MAs@L2. Accordingly, proactive monitoring provides a mechanism for fast detection of system degradations, enabling self-healing procedures to be undertaken before the system degrades to an undesirable state.

Figure 15:
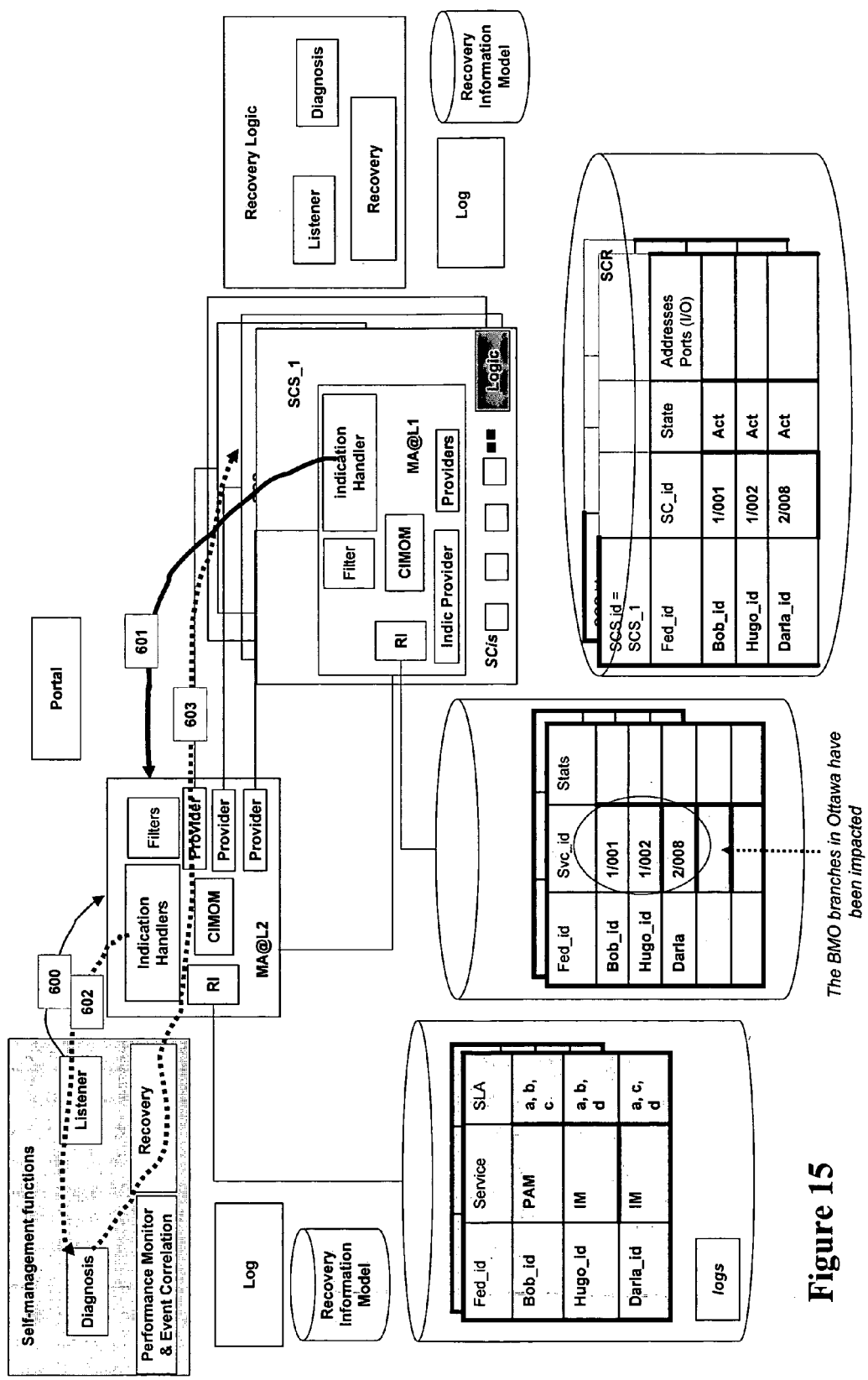
FIG. 15 is a system diagram which is used to illustrate a method of proactive service monitoring wherein the management agents detect that a service behavior matches a known service degradation pattern.

Referring now to FIG. 15, the proactive monitoring can also use pattern recognition techniques, where certain patterns of behavior that are associated with system degradation or failure are detected and corrected before any problems occur. Assume a self-management functional component 600 subscribes interest to an indication associated with slow response time for video-streaming services affecting users in all Montreal banks located in Ottawa, Ontario, Canada. Local actions by the MA@L1 have not solved the problem. Thus, at step 601, one of the MA@L1 is appointed by peers to send an indication of the recognition of a degraded performance pattern (slow response time) to an MA@L2. At step 602, the MA@L2 transfers the indication to the self-management functional component. The self-management functional component diagnoses the problem and at step 603, applies the appropriate recovery function associated with the pattern of degradation, to correct the slow response time behavior. Thus it can be seen that the management agents may communicate with peers in their own management layer, and higher management layers to accelerate the diagnosis of local problems and trigger the required recovery mechanism.

Accordingly, a method and apparatus for providing autonomous, dynamic self-healing service architecture has been shown and described. The service oriented architecture supports a variety of management behaviors including event registration, pro-active monitoring of SLA's Service Level Objectives (SLO) violations and performance degradations, dynamic diagnosis of performance or failure problems, accelerated execution of dynamic restoration and recovery procedures, run-time verification of applied restoration and recovery procedures, dynamic logging of and selective sharing of information with other service instances. The service architecture is enabled through the hierarchical layering of service instances, capabilities and elements, and the loose coupling of a hierarchy of management agents with the service hierarchy. With such an arrangement, a scalable multi-service multi-vendor architecture may be provided with low OpEx and TOC for carriers, service providers and large enterprises.

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A system comprising a service architecture comprising:
a hierarchy of service layers including a service user layer comprising an interface by which a user builds a service instance, a service access layer for controlling access to service instances by the user, a service capability layer comprising service capability instances associated with the service instances and a service element layer comprising elements available to the service capability instances, wherein each service instance is a self-managed aggregation of service capabilities delivered to the user via assigned service components according to a service level agreement; and
a plurality of hierarchically linked management agents, at least one management agent associated with each one of the service layers, for cooperatively managing, with other management agents associated with a service layer, a plurality of service layer components of the service instance at and below the associated service layer including discovering, monitoring and, in the event of detection of a degradation of performance of the service instance, replacing service layer components associated with a service instance at and below the associated service layer.

2. The service architecture of claim 1, further comprising:
an information repository apportioned into a plurality of management repositories, wherein each management repository is associated with one of the management agents, and accessible by the associated management agent and any management agents senior to the associated management agent in the hierarchy of management agents.

3. The service architecture of claim 2, wherein information repository further comprises an information records component for storing information related to service component behavior.

4. The service architecture of claim 3 wherein the information includes an event log associated with the service components.

5. The service architecture of claim 3 wherein the information includes performance information.

6. The service architecture of claim 3 wherein the information includes accounting information.

7. The service architecture of claim 3, wherein the information repository further comprises an information model component for storing object information associated with the service components in the hierarchy.

8. The service architecture of claim 7 wherein the object information includes physical topology data associated with the service component.

9. The service architecture of claim 7 wherein the object information includes logical topology data associated with the service components.

10. The service architecture of claim 7 wherein the object information includes a model of the hierarchy of the service components.

11. The service architecture of claim 7 wherein the object information includes service component objects.

12. The service architecture of claim 3 wherein the information repository further comprises an operations model component comprising routines capable of being invoked to access information records and information models.

13. The service architecture of claim 12 wherein the operations models include a set of recovery operation service instances that are indexed using a cause-condition pair.

14. The service architecture of claim 12 wherein the operation models include a set of workflow management routines.

15. The service architecture of claim 12 wherein the operation models include a set of performance operations.

16. The service architecture of claim 1, wherein each of the management agents interact with an event-log, for logging events related to the service layer components in the associated service layer.

17. The service architecture of claim 16, wherein each of the management agents includes a learning module, coupled to the event log, for controlling operation of the service component and a list of alternative service components to be used to replace the service component upon detection of a degradation of service component performance.

18. The service architecture of claim 1 wherein the service element layer is at a first lowest layer in the hierarchy and includes service elements and network elements.

19. The service architecture of claim 18, wherein the service capability layer is at a second layer in the hierarchy that is a parent layer to the first layer.

20. The service architecture of claim 19, wherein the service access layer is at a third layer in the hierarchy above the second layer.

21. The service architecture of claim 1 wherein the management agents in the hierarchy communicate by forwarding request and notification messages up and down the hierarchy.

22. A computer-implemented method for dynamic self healing of a service comprising a plurality of hierarchically ordered service component layers comprises the steps of:
- deploying a plurality of cooperating management agents including a management agent for each service component layer;
- discovering, by at least one management agent associated with at least one service layer, a service component associated with the service component layer;
- monitoring, by the management agent associated with the service component layer, a performance of the service component to determine if the performance is in accordance with a contracted service level agreement of the service instance, wherein the service instance is a self-managed aggregation of service capabilities associated with service components, and is delivered to the user according to the service level agreement;
- detecting, by the management agent, a performance issue associated with the service component;
- upon detecting the performance issue, the management agent forwarding an alarm to a parent management agent associated with a parent service component of the service component; and
- the child management agent triggering recovery at the service component, including discovering an alternate service component to replace the service component to allow continued support of the service, selecting, in cooperation with peer management agents, the alternate service component wherein the plurality of hierarchically ordered service component layers includes a service user layer comprising an interface by which a user builds a service instance, a service access layer for controlling access to service instances by the user, a service capability layer comprising service capability instances associated with the service instances and a service element layer comprising elements available to the service capability instances.

23. The method of claim 22 including the steps of logging, at each of the service component layers, a handling of the performance issue.

24. The method of claim 23 including the step of reviewing a log of past handling of performance issues and a list of alternate service components to proactively select an appropriate recovery action including replacing the service component with the alternate service component for supporting the service upon detection of a degradation of performance of the service component.

25. The method of claim 22 wherein the service element layer is at a first lowest layer in the hierarchy and includes service elements and network elements.

26. The method of claim 25, wherein the service capability layer is at a second layer in the hierarchy that is a parent layer to the first layer.

27. The method of claim 26, wherein the service access layer is at a third layer in the hierarchy above the second layer.

28. A computer-implemented method for building a self-managed service network, wherein the service architecture comprises hierarchically linked service component layers includes the steps of:
- deploying a plurality of management agents in the network, at least one management agent associated with each service component layer for cooperatively managing, with other management agents associated with the service component layer, a plurality of service layer components at and below the associated service layer, the service component layers including a service user layer comprising an interface by which a user builds a service instance, a service access layer for controlling access to service instances by the user, a service capability layer comprising service capability instances associated with the service instances and a service element layer comprising elements available for use by the service capability instances, wherein each service instance is a self-managed aggregation of service capabilities delivered to the user according to a service level agreement and wherein each management agent includes functionality for managing service components at and below the associated layer of the network;
- a management agent associated with at least one service component layer discovering a service component associated with the at least one service component layer; and
- registering service components in the network, the service component being registered at a particular layer of the network, including storing information associated with the service component in a repository accessible by the management agent associated with the particular layer to allow service components to be selectively replaced by the management agent corresponding to the particular layers in response to a detection of a degradation of performance of the service instance.

* * * * *